(12) United States Patent
Tada

(10) Patent No.: US 6,283,159 B1
(45) Date of Patent: Sep. 4, 2001

(54) DOUBLE-WALLED PIPE STRUCTURE

(75) Inventor: Minoru Tada, Mie (JP)

(73) Assignee: Bestex Kyoei Co., Ltd., Mie (JP)

( * ) Notice: Subject to any disclaimer, the term of this patent is extended or adjusted under 35 U.S.C. 154(b) by 0 days.

(21) Appl. No.: 09/209,194

(22) Filed: Dec. 10, 1998

(30) Foreign Application Priority Data

Sep. 1, 1998 (JP) .................................................. 10-246767
Dec. 7, 1998 (JP) .................................................. 10-346279

(51) Int. Cl.$^7$ ........................................................ F16L 9/18
(52) U.S. Cl. ..................... 138/116; 138/111; 138/DIG. 11
(58) Field of Search ..................................... 138/114, 111, 138/115, 116, DIG. 11, 38

(56) References Cited

U.S. PATENT DOCUMENTS

| 520,222 | * | 5/1894 | Rodin ................................... 138/114 |
|---|---|---|---|
| 1,150,407 | * | 8/1915 | Wells ...................................... 138/38 |
| 1,242,473 | * | 10/1917 | Prentice ................................. 138/38 |
| 2,386,159 | * | 10/1945 | Elder ....................................... 138/38 |
| 2,756,032 | * | 7/1956 | Dowell .................................. 138/114 |
| 2,929,408 | * | 3/1960 | Weatherwax et al. ............... 138/116 |
| 3,000,495 | * | 9/1961 | Downing ............................... 138/114 |
| 3,585,910 | * | 6/1971 | Brown et al. ......................... 138/115 |
| 4,163,474 | * | 8/1979 | MacDonald et al. ................... 138/38 |
| 4,397,304 | * | 8/1983 | Villain ................................... 138/114 |
| 4,743,329 | * | 5/1988 | Hata ...................................... 138/115 |

\* cited by examiner

Primary Examiner—James Hook
(74) Attorney, Agent, or Firm—Merchant & Gould P.C.

(57) ABSTRACT

A deformed pipe having a deformed cross-sectional shape is press-fitted in a round hollow pipe having a circular cross-sectional shape. The deformed pipe has a plurality of radially outwardly projecting ridges having respective outermost vertexes held in contact with an inner circumferential surface of the round hollow pipe. The round hollow pipe and the deformed pipe are arc-welded to each other at axially spaced locations.

4 Claims, 4 Drawing Sheets

DOUBLE-WALLED PIPE STRUCTURE

BACKGROUND OF THE INVENTION

1. Field of the Invention

The present invention relates to a double-walled pipe structure comprising a plurality of pipes of different cross-sectional shapes combined for increased mechanical strength and reduced weight.

2. Description of the Related Art

Various pipes have been used as structural parts for automobiles, for example. In various applications, pipes of different pipe diameters and wall thicknesses are selected to meet demands for different mechanical strengths and weights. If one pipe material is used in an application where it is subject to different loads at different positions, then it is the general practice to determine a pipe diameter and a wall thickness based on the mechanical strength of a pipe portion subject to a maximum load, or to join a pipe having a larger diameter or a greater wall thickness and a pipe having a smaller diameter or a smaller wall thickness to each other by welding or the like.

Even if the mechanical strength of a pipe should be varied directionally, it is customary to determine a pipe diameter and a wall thickness based on the mechanical strength of the pipe with respect to the direction in which a maximum load is applied.

According to the conventional practice of determining a pipe diameter and a wall thickness based on either the mechanical strength of a pipe portion subject to a maximum load or the mechanical strength of the pipe with respect to the direction in which a maximum load is applied, the resultant pipe tends to be too heavy as a whole and also too strong in pipe portions that are not required to be so strong.

Furthermore, it is time-consuming and expensive to carry out the process of joining a pipe having a larger diameter or a greater wall thickness and a pipe having a smaller diameter or a smaller wall thickness to each other by welding or the like.

SUMMARY OF THE INVENTION

It is therefore an object of the present invention to provide a double-walled pipe structure suitable for use in applications where different loads are applicable at different positions or in different directions.

According to an aspect of the present invention, there is provided a double-walled pipe structure defined in claim 1 comprising a hollow pipe and a deformed pipe having a deformed cross-sectional shape and press-fitted in said hollow pipe. The deformed pipe has a plurality of ridges projecting radially outwardly and having respective vertexes held in contact with an inner circumferential surface of said hollow pipe.

There is also provided a double-walled pipe structure defined in claim 2 comprising a hollow pipe and a deformed pipe being a flat pipe and press-fitted in said hollow pipe. The deformed pipe has a plurality of vertexes held in contact with an inner circumferential surface of said hollow pipe.

Since the ridges are held in contact with the inner circumferential surface of said hollow pipe, the double-walled pipe structure has an increased mechanical strength in radial directions where the ridges are present. Therefore, the mechanical strength of the double-walled pipe structure depends on the radial direction thereof.

The hollow pipe may have a circular cross-sectional shape, an angular cross-sectional shape such as a rectangular cross-sectional shape, or any of various polygonal cross-sectional shapes.

The deformed pipe may have two, three, four, or more ridges that are circumferentially spaced at equal intervals. The ridges are spaced equally from the central axis of the deformed pipe, and hence are equally held in contact with the inner circumferential surface of said hollow pipe.

The hollow pipe and the deformed pipe are fixedly joined, preferably arc-welded, to each other at axially spaced locations.

The deformed pipe may be inserted longitudinally partly in said hollow pipe. With the deformed pipe inserted longitudinally partly in said hollow pipe, the mechanical strength of the portion of the double-walled pipe structure where the deformed pipe is present is higher than that of the portion of the double-walled pipe structure which is devoid of the deformed pipe. The double-walled pipe structure may be used in applications where different loads are applied at different positions. This double-walled structure can be produced simply by inserting the deformed pipe into the hollow pipe, rather than joining pipes of different diameters or wall thicknesses.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
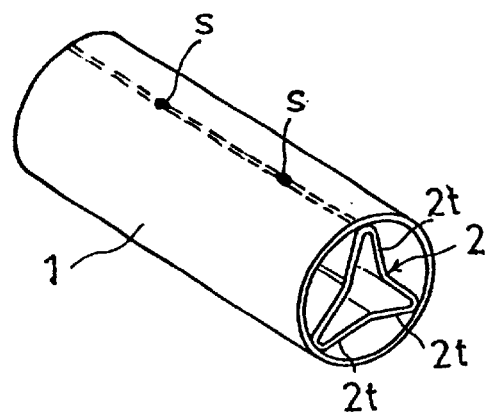
FIG. 1 is a perspective view of a double-walled pipe structure according to an embodiment of the present invention, the double-walled pipe structure including a round hollow pipe.

As shown in FIGS. 1, a double-walled pipe structure according to an embodiment of the present in invention comprises a combination of pipes including around hollow pipe 1 having a circular cross-sectional shape, such as a steel pipe, and a deformed pipe 2 press-fitted axially into the round hollow pipe 1 with relatively light forces. The round hollow pipe 1 and the deformed pipe 2 are fixedly joined to each other at axially spaced locations s by arc welding or the like.

Figure 2:
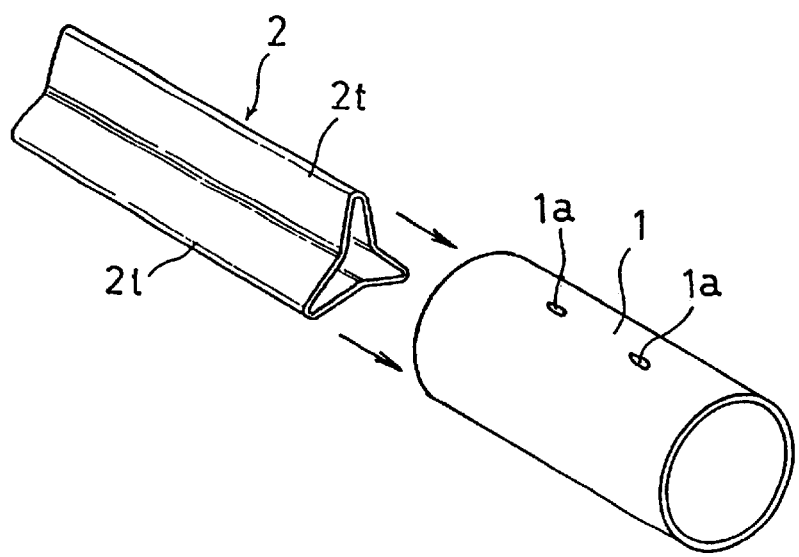
FIG. 2 is an exploded perspective view of the double-walled pipe structure shown in FIG. 1.

As shown in FIG. 2, in a method of fixedly joining a deformed pipe 2 to a round hollow pipe 1, holes 1a are formed in the round hollow pipe 1 in advance, the deformed pipe 2 is inserted to fit the vertexes of the deformed pipe 2 to the holes 1a, and the deformed pipe 2 are fixedly joined by arc welding.

As a method of fixedly joining a deformed pipe 2 to a round hollow pipe 1, it is not limited to the welding as mentioned-above, hard press-fitting and crimping which save welding may be applied in response to use.

The double-walled pipe structure is preferably used in applications such as steering hanger beams or door beams of automobiles which are required to be highly rigid in certain directions and less rigid in directions crossing those certain directions.

The deformed pipe 2 has a plurality of axially extending ridges 2t projecting radially outwardly and having respective outermost vertexes which represent such an outside diameter as to allow the deformed pipe 2 to be press-fitted into the round hollow pipe 1 with relatively light forces. The vertexes of the ridges 2t are held in contact with an inner circumferential surface of the round hollow pipe 1. In the embodiment shown in FIGS. 1 and 2, the deformed pipe 2 has three ridges 2t circumferentially spaced at equal intervals about the central axis of the deformed pipe 2, the ridges 2t each having a triangular cross-sectional shape. However, the deformed pipe 2 may have four ridges 2t as shown in FIG. 5B, or two ridges 2t as shown in FIG. 5C, or five or more ridges (not shown).

Figure 5A:
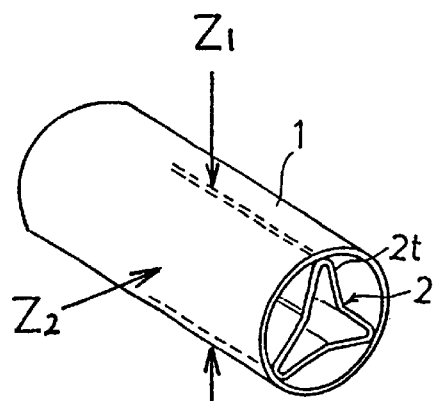
FIGS. 5A through 5D are perspective views of various double-walled pipe structures which were tested for mechanical strength.
Figure 5B:
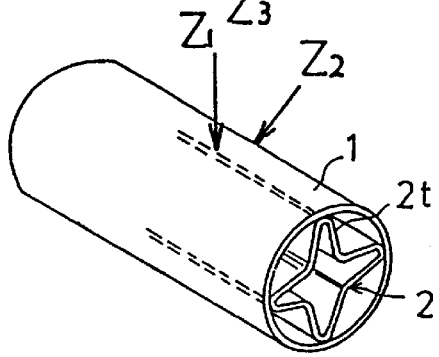
Figure 5C:
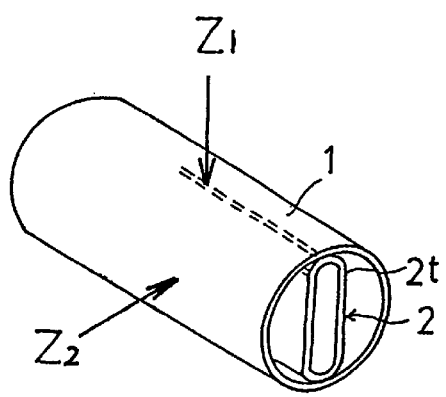

If the deformed pipe 2 has two diametrically opposite ridges 2t spaced across the central axis thereof, then the deformed pipe 2 is in the form of a flattened pipe or a pipe having an elliptical cross-sectional shape, as shown in FIG. 5C.

Figure 3A:
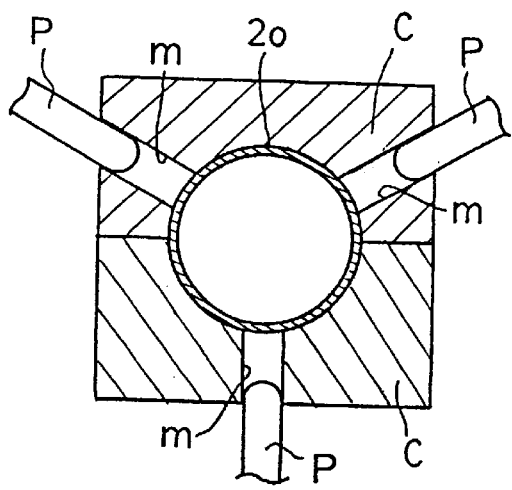
FIGS. 3A and 3B are cross-sectional views illustrative of a process of producing a deformed pipe for use in the double-walled pipe structure shown in FIG. 1.
Figure 3B:
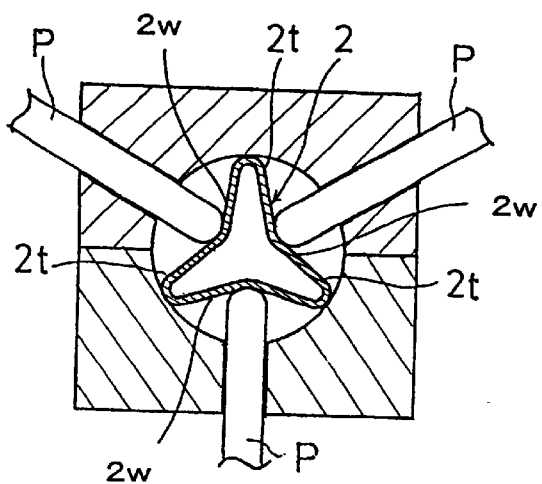

The deformed pipe 2 is produced as follows: As shown in FIG. 3A, a blank pipe 20 having a circular cross-sectional shape is clamped between a pair of clamping dies C, and three punches P are simultaneously driven radially inwardly through respective angularly spaced slots m defined in the clamping dies C. As shown in FIG. 3B, the tip ends of the punches P press the blank pipe 20 radially inwardly to deform it from the circular cross-sectional shape into a three-pointed cross-sectional shape, producing the deformed pipe 2 with the three ridges 2t. The deformed pipe 2 has concave side wall portions 2w extending between the ridges 2t.

If the deformed pipe 2 has four ridges 2t as shown in FIG. 5B, then it can be formed by four punches that are simultaneously driven radially inwardly through respective angularly spaced slots defined in the clamping dies.

With the deformed pipe 2 fixedly press-fitted in the round hollow pipe 1, the double-walled pipe structure has different mechanical strengths in different directions.

Various double-walled pipe structures were tested for mechanical strength, as shown in FIGS. 5A through 5D.

FIG. 5A shows a double-walled pipe structure comprising a round hollow pipe 1 and a deformed pipe 2 press-fitted in the round hollow pipe 1, the deformed pipe 2 having three circumferentially equally spaced ridges 2t. The double-walled pipe structure had a length of 150 mm, and was subjected to a load Z1 of 10 kgf applied from the vertex of one of the ridges 2t toward the center of the double-walled pipe structure, a load Z2 of 10 kgf applied in a direction perpendicular to the load Z1 toward the center of the double-walled pipe structure, and a load Z3 of 10 kgf applied in a direction diametrically opposite to the load Z1 toward the center of the double-walled pipe structure. Maximum stresses (MS: kgf/mm$^2$) and displacements (D: mm) of the double-walled pipe structure at the respective loaded points were measured. The results are given under No. 1 in Table shown below.

In this case, STAM290GA (JIS(Japanese Industrial Standards) G3472) is used as the quality of the material of the round hollow pipe 1, the external diameter thereof is 35 mm and the thickness thereof is 1.0 mm. STAM290GA is used as the quality of the material of the deformed pipe 2 and the thickness thereof is 1.0 mm.

FIG. 5B shows a double-walled pipe structure comprising a round hollow pipe 1 and a deformed pipe 2 press-fitted in the round hollow pipe 1, the deformed pipe 2 having four circumferentially equally spaced ridges 2t. The double-walled pipe structure had a length of 150 mm, and was subjected to a load Z1 of 10 kgf applied from the vertex of one of the ridges 2t toward the center of the double-walled pipe structure, and a load Z2 of 10 kgf applied in a direction between adjacent two ridges 2t toward the center of the double-walled pipe structure. Maximum stresses (MS: kgf/mm$^2$) and displacements (D: mm) of the double-walled pipe structure at the respective loaded points were measured. The results are given under No. 2 in Table shown below.

In this case, the round hollow pipe 1 has the same quality of the material and size as the round hollow pipe 1 as shown in FIG. 5A. The thickness of the deformed pipe 2 is also 1.0 mm.

FIG. 5C shows a double-walled pipe structure comprising a round hollow pipe 1 and a deformed pipe 2 press-fitted in the round hollow pipe 1, the deformed pipe 2 having two diametrically opposite ridges 2t. The double-walled pipe structure had a length of 150 mm, and was subjected to a load Z1 of 10 kgf applied from the vertex of one of the ridges 2t toward the center of the double-walled pipe structure, and a load Z2 of 10 kgf applied in a direction perpendicular to the load Z1 toward the center of the double-walled pipe structure. Maximum stresses (MS: kgf/mm$^2$) and displacements (D: mm) of the double-walled pipe structure at the respective loaded points were measured. The results are given under No. 3 in Table shown below.

In this case, the round hollow pipe 1 has the same quality of the material and size as the round hollow pipe 1 as shown in FIG. 5A. The thickness of the deformed pipe 2 is also 1.0 mm.

Figure 5D:
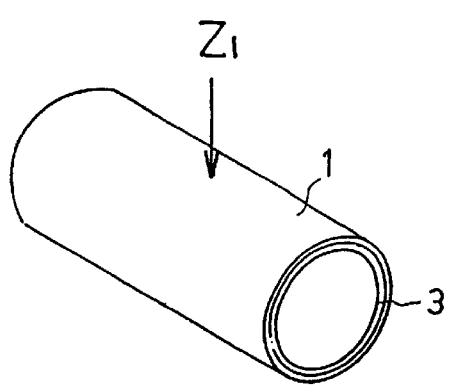

FIG. 5D shows a double-walled pipe structure, according to a comparative example, comprising a round hollow pipe 1 and a round hollow pipe 3 press-fitted in the round hollow pipe 1. The double-walled pipe structure had a length of 150 mm, and was subjected to a load Z1 of 10 kgf applied from any desired point toward the center of the double-walled pipe structure. A maximum stress (MS: kgf/mm$^2$) and a displacement (D: mm) of the double-walled pipe structure at the loaded point were measured. The results are given under No. 4 in Table shown below.

In this case, the round hollow pipe 1 has the same quality of the material and size as the round hollow pipe 1 as shown in FIG. 5A. The quality of the material of the deformed pipe 2 is the same, the external diameter thereof is 35 mm and the thickness thereof is 1.0 mm.

TABLE

| Shape | | | No. 1 FIG. 5A | No. 2 FIG. 5B | No. 3 FIG. 5C | No. 4 FIG. 5D |
|---|---|---|---|---|---|---|
| Loading Directions | Z1 | MS | 1.03 | 1.069 | 1.169 | 1.691 |
| | | D | 0.002909 | 0.003912 | 0.003101 | 0.004055 |
| | Z2 | MS | 4.325 | 3.837 | 4.525 | |

TABLE-continued

| Shape | | No. 1 FIG. 5A | No. 2 FIG. 5B | No. 3 FIG. 5C | No. 4 FIG. 5D |
|---|---|---|---|---|---|
| Z3 | D | 0.001081 | 0.009666 | 0.001208 | |
| | MS | 4.003 | | | |
| | D | 0.009824 | | | |

It can be seen from the results of the test that whereas the maximum stress developed in the double-walled structure according to the comparative example shown in FIG. 5D is 1.691 kgf/mm$^2$, the maximum stresses developed in the double-walled structures shown in FIGS. 5A through 5C are greater or smaller than 1.691 kgf/mm$^2$, depending on the loading direction, and that the double-walled structures shown in FIGS. 5A through 5C have direction-dependent mechanical strengths.

Figure 4:
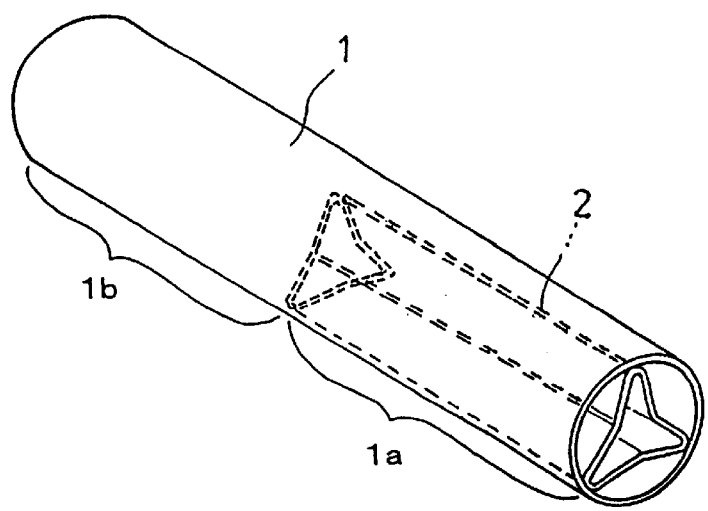
FIG. 4 is a perspective view of a double-walled pipe structure which includes a deformed pipe inserted longitudinally partly in a round hollow pipe.

FIG. 4 shows a double-walled structure in which a deformed pipe 2 is inserted axially, i.e., longitudinally, partly in a round hollow pipe 1. The mechanical strength of the double-walled structure shown in FIG. 4 is greater in a portion 1a thereof in which the deformed pipe 2 is inserted than in a portion 1b thereof which is devoid of the deformed pipe 2. The double-walled pipe structure shown in FIG. 4 may be used in applications where different loads are applied at different positions. The double-walled structure shown in FIG. 4 can be produced simply by inserting the deformed pipe 2 into the round hollow pipe 1, rather than joining pipes of different diameters or wall thicknesses.

Figure 6:
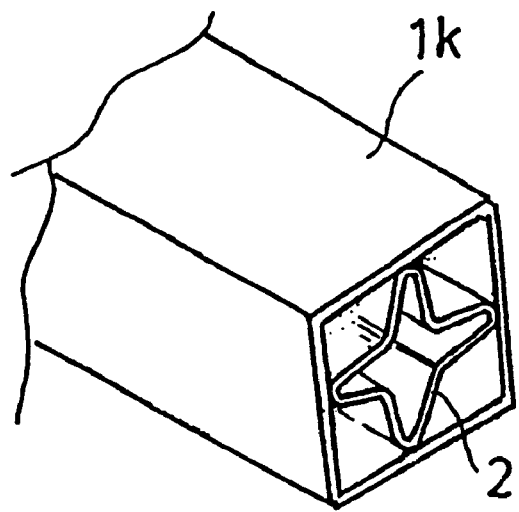
FIG. 6 is a perspective view of a double-walled pipe structure according to another embodiment of the present invention, the double-walled pipe structure including a rectangular hollow pipe.

In the above embodiments, the round hollow pipe 1 is used as a hollow pipe in which a deformed pipe is inserted. However, as shown in FIG. 6, an angular hollow pipe 1k having an angular cross-sectional shape may be used as a hollow pipe in which a deformed pipe is inserted. The angular hollow pipe 1k may be a triangular hollow pipe having a triangular cross-sectional shape, a rectangular hollow pipe having a rectangular cross-sectional shape, as shown in FIG. 6, a pentagonal or quinquangular hollow pipe having a pentagonal or quinquangular cross-sectional shape, or another polygonal hollow pipe having a polygonal cross-sectional shape.

The round hollow pipe 1 or the angular hollow pipe 1k, and the deformed pipe 2 may be made of any of various materials, and may be joined to each other by any of various joining processes.

Although certain preferred embodiments of the present invention have been shown and described in detail, it should be understood that various changes and modifications may be made therein without departing from the scope of the appended claim.

What is claimed is:

1. A double-walled pipe structure comprising:

a hollow pipe having an inner circumferential surface; and a deformed pipe having a deformed cross-sectional shape and press-fitted in said hollow pipe, said deformed pipe being formed from a circular one-piece cross-sectional shape to a shape having a plurality of end portions with concave side wall portions between said end portions;

said formed pipe having a plurality of vertices held in contact with the inner circumferential surface of said hollow pipe; and wherein said hollow pipe and said deformed pipe are fixedly joined to each other at the axially spaced locations.

2. A double-walled pipe structure according to claim 1, wherein said hollow pipe and said deformed pipe are arc-welded to each other at axially spaced locations.

3. A double-walled pipe structure comprising;

a hollow pipe having an inner circumferential surface; and a deformed pipe flattened on opposite sides to form flattened sides and opposite end portions between the flattened sides and press-fitted in said hollow pipe, said deformed pipe having the opposite end portions contacting said inner circumferential surface of said hollow pipe;

wherein said hollow pipe and said deformed pipe are fixedly joined to each other at axially spaced locations; and wherein said pipe structure has minimum and maximum stress resistance in perpendicular directions.

4. A double-walled pipe structure, comprising;

a one-piece hollow pipe having first and second portions, said hollow pipe having an inner circumferential surface;

a deformed pipe press-fitted in the first portion of said hollow pipe, said second portion being devoid of said deformed pipe, said deformed pipe being flattened on opposite sides to form flattened sides and opposite end portions between the flattened sides, said deformed pipe having the opposite end portions contacting with the inner circumferential surface of said hollow pipe;

wherein mechanical strength of said double-walled structure is greater in the first portion than in the second portion so that said double-walled structure can be used where different loads are applied at different positions.

* * * * *